United States Patent [19]

Koike et al.

[11] Patent Number: 5,410,523
[45] Date of Patent: Apr. 25, 1995

[54] OPTICAL PICKUP DRIVING APPARATUS

[75] Inventors: Shigeaki Koike; Kenji Kasahara; Hiroshi Hasegawa, all of Kanagawa, Japan

[73] Assignee: Sony Corporation, Tokyo, Japan

[21] Appl. No.: 91,653

[22] Filed: Jul. 14, 1993

[30] Foreign Application Priority Data

Jul. 20, 1992 [JP] Japan .................. 4-191794

[51] Int. Cl.$^6$ ............................... G11B 7/00
[52] U.S. Cl. ................. 369/44.15; 369/44.17; 369/44.27; 369/44.13
[58] Field of Search ............... 369/44.13, 44.14, 44.15, 369/44.17, 244, 249, 215, 219, 222, 223, 44.27, 44.21; 359/813, 823

[56] References Cited

U.S. PATENT DOCUMENTS

| | | | |
|---|---|---|---|
| 5,124,973 | 6/1992 | Igata | 369/244 |
| 5,210,739 | 5/1993 | Nakagishi | 369/244 |
| 5,289,319 | 2/1994 | Aviles et al. | 369/44.21 |
| 5,293,363 | 3/1994 | Takeshita | 369/44.21 |
| 5,297,127 | 3/1994 | Ohtsuka et al. | 369/44.14 |
| 5,305,299 | 4/1994 | Maeda | 369/215 |
| 5,307,339 | 4/1994 | Tanaka | 369/215 |
| 5,311,497 | 5/1994 | Takizawa et al. | 369/219 |

FOREIGN PATENT DOCUMENTS 63-71934  4/1988  Japan .

*Primary Examiner*—Georgia Y. Epps
*Assistant Examiner*—Nabil Hindi
*Attorney, Agent, or Firm*—Limbach & Limbach

[57] ABSTRACT

An optical pickup driving apparatus including an optical pickup device for reading data recorded on the data recording surface of an optical disc recording medium. The optical pickup device is supported for free rotation in a plane parallel with and facing to the data recording surface.

8 Claims, 5 Drawing Sheets

OPTICAL PICKUP DRIVING APPARATUS

BACKGROUND OF THE INVENTION

Upon recording of data from a music or image source on an optical disc recording medium, the data are converted into a digital signal having logic "0" and "1" levels. According to the logic level, pits are formed to provide a continuous spiral recording track in the optical disc recording medium. An optical pickup device is used to reproduce the recorded data by radiating a light beam from a light source such as a semiconductor laser through an objective lens which focuses the light beam so as to produce a light spot of a predetermined constant diameter on the optical disc recording medium and sensing the light beam reflected from the optical recording medium to determine the presence of pits. For this purpose, the objective lens is supported in such a manner that its optical axis can follow the spiral recording track while the optical disc recording medium is rotating during the data reproducing operation.

A grating technique is used to divide the light beam in a manner to produce three light spots on the optical disc recording medium. These light spots include a main spot 2A and two side spots 2B and 2C produced on the opposite sides of the main spot 2A and offset a predetermined distance in a direction normal to the diameter of the optical disc recording medium, as shown in FIG. 6. The light beam reflected on the main spot 2A is used for data reproduction and also focusing servo control. The light beams reflected on the side spots 2B and 2C are used for tracking servo control.

In order to detect the pits with high accuracy, the light spots 2A, 2B and 2C should be retained in position with respect to the recording track 1a formed in the optical disc recording medium 1. If the orbit L of movement of the objective lens (not shown) is parallel with and spaced a distance $\Delta r$ away from a straight line T extending through the center O of rotation of the spindle, the main spot 2A will deviate from a desired recording track and the tracking error signal resulting from the light beams reflected on the side spots 2B and 2C will have a reduced modulation factor. Assuming now that $\theta$ is the angle made by the straight line extending through the side spots 2B and 2C with respect to the tangent of the recording track 1a at a point through which the straight line T extends, $\theta_1$ is the angle made by the straight line extending through the side spots 2B and 2C with respect to the tangent of the recording track 1a at a point through which the orbit L extends, and R is the distance between the recording track 1a and the center O of rotation of the spindle, the following equation is established:

$$\theta_1 = \theta \pm (\Delta r / R) \qquad 1)$$

As can be seen from Equation (1), the deviated angle $\Delta\theta$ ($=\theta_1 - \theta$) resulting from the offset $\Delta r$ is dependent on the radius of the optical disc recording medium 1. This is referred to as "radial dependence".

It has been proposed, in Japanese Patent Kokai No. 63-71934 entitled "Optical Pickup Driving Apparatus", to avoid the difficulty resulting from the radial dependence by rotatably supporting the feed shaft, which is used to guide the optical pickup device, in a manner to adjust the orbit of movement of the objective lens into coincidence with the straight line extending through the center of rotation of the spindle. With such a conventional optical pickup driving apparatus arranged to rotate the feed shaft upon adjustment of the deviation of the light spots, however, the rotation of its optical system is limited within a narrow range. As a result, the amount by which the deviation of the light spots can be adjusted is limited and the capacity of absorbing errors occurring upon attaching the optical pickup device is limited.

SUMMARY OF THE INVENTION

A main object of the invention is to provide an improved optical pickup driving apparatus which can increase the light spot deviation adjustment range so as to provide an increased capacity of absorbing errors occurring upon attaching the optical pickup device.

There is provided, in accordance with the invention, an optical pickup driving apparatus for driving an optical pickup device with respect to an optical disc recording medium having a recording track provided therein. The optical pickup device includes means for radiating light beams to produce a data reading light spot and tracking light spots so as to read data recorded on the recording track. The optical pickup driving apparatus comprises first carriage means guided for movement in a direction parallel with a straight line extending through a center about which the optical disc recording medium rotates, holding means for holding the optical pickup device, coupling means for coupling the holding means to the first carriage means for rotation on the first carriage means about a center spaced from the light spots so as to rotate the optical pickup device in a plane parallel with and facing to the optical disc recording medium, and adjusting means for rotating the holding means to adjust the positions of the tracking light spots or the data reading light spot with respect to the recording track.

According to the invention, the optical pickup device can be rotated to adjust the deviation of the light spots produced on the data recording surface of the optical disc recording medium.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
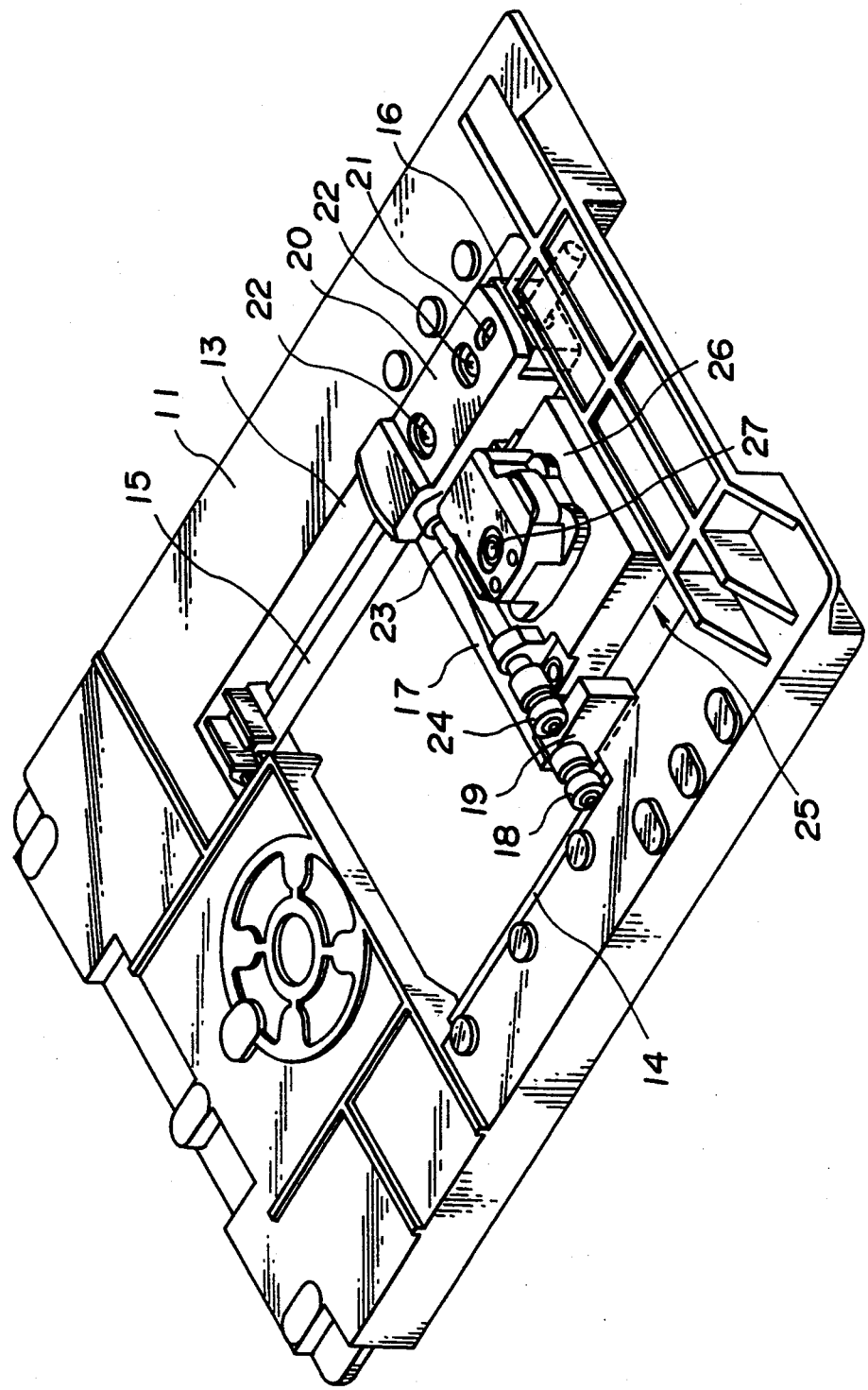
FIG. 1 is a perspective view showing one embodiment of an optical pickup driving apparatus made in accordance with the invention.
Figure 2:
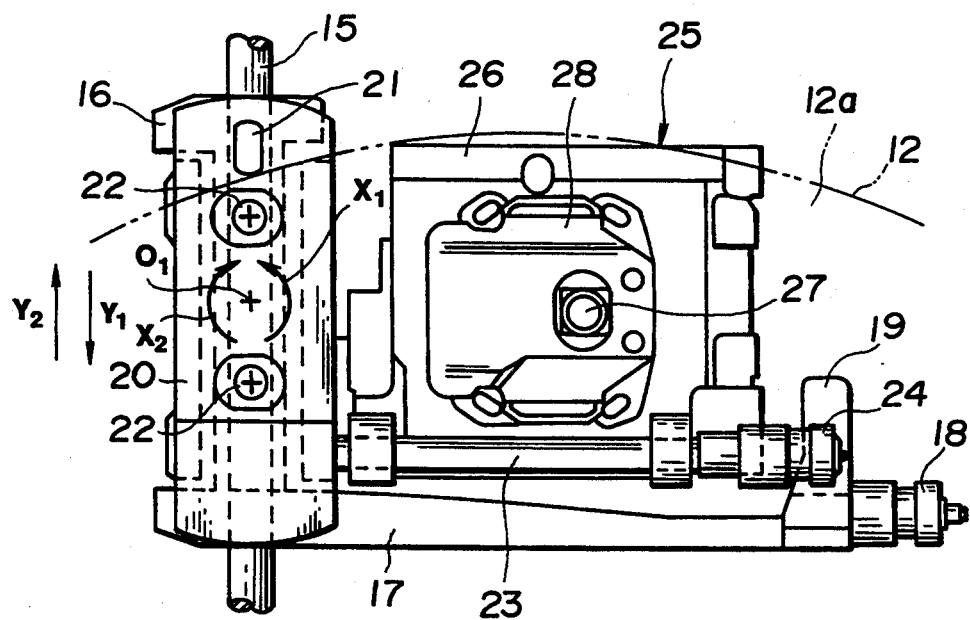
FIG. 2 is a fragmentary plan view showing the significant portion of the optical pickup driving apparatus of FIG. 1.
Figure 3:
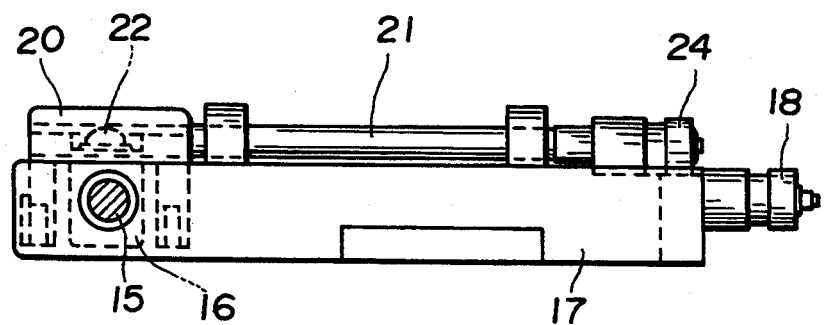
FIG. 3 is a side view of the optical pickup driving apparatus of FIG. 2.

Referring to FIGS. 1 to 3, there is shown a video disc player which employs an optical pickup driving apparatus embodying the invention. The video disc player includes a base 11 having a spindle motor (not shown) secured thereon near the front end thereof for providing a high-speed rotational force to an optical disc recording medium 12. The base 11 is formed near its rear end with a rectangular window 13 elongated in the direction of length of the base 11. A rail 14 extends along one of the side surfaces of the window 13, and a feed shaft 15 extends along the other side surface of the window 13 in a direction parallel with the rail 14. The feed shaft 15 has a first carriage 16 mounted thereon for sliding movement in the forward and rearward directions. The first carriage 16 has a shaft holder 17 secured thereon near its front end. The shaft holder 17 extends in the direction normal to the direction of the feed shaft 15. The shaft holder 17 is provided at its free end with a roller 18 placed on the rail 14. The shaft holder 17 is also provided near the roller 18 with a projection piece 19 for holding a roller to be described later.

A second carriage 20 is formed with an elongated hole 21 and fixed on the first carriage 16 by means of bolts 22. A parallel pin (not shown) is provided to couple the second carriage 20 to the first carriage 16 so as to permit the second carriage 20 to rotate about the parallel pin (center $O_1$) in a plane parallel with and facing to the recording surface 12a of the optical disc recording medium 12. The center $O_1$ of rotation of the second carriage 20 is spaced a predetermined distance away from an objective lens 27 to be described later. The second carriage 20 has a skew shaft 23 fixed thereto near its front end by a snap fit. The skew shaft 23 extends in the direction of width of the base 11 and it is provided at its free end with a roller 24 placed on the projection piece 19.

The video disc player also includes an optical pickup device 25 for reading optical data recorded on the optical disc recording medium 12. The optical pickup device 25, which is positioned above the base 11, includes a support member 26 mounted on the skew shaft 23 for free rotation, and a cover 28 which contains an objective lens 27 and a reflector (not shown). With rotation of the second carriage 20, the optical pickup device 25 rotates in a plane parallel with and facing to the recording surface 12a of the optical disc recording medium 12. In FIG. 2, the characters Y1 and Y2 indicate the directions of advancing and retracting movement of the first carriage 16, and the characters X1 and X2 indicate the directions of rotation of the second carriage 20.

With this arrangement of the optical pickup driving apparatus, it is possible to adjust the deviated angle of the light spots produced on the recording surface 12a of the optical disc recording medium 12 by rotating the optical pickup device 25 around the center $O_1$ spaced away from the center of the objective lens 27. This is effective to provide a wider range in which the optical system can rotate so as to increase the amount by which the deviated angle of the light spots can be adjusted. Since the center of rotation of the second carriage 20 is set at a position spaced away from the objective lens 27, it is possible to simplify the structure used for adjusting the rotation of the optical pickup device 25. Since the optical pickup device 25 can be rotated to adjust the deviated angle of the light spots, it is possible to absorb errors occurring upon assembling the optical pickup device.

The operation of the optical pickup driving apparatus of the invention will be described. First of all, an eccentric driver is placed in the elongated hole 21 and is used to rotate the second carriage 20 in a direction indicated by the arrow X1 or X2 so as to rotate the optical pickup device 25. When the orbit L of movement of the objective lens 27 is deviated to the left, as viewed in FIG. 6, at a distance $\Delta r$ away from the straight line T extending through the center O of rotation of the spindle, that is, the straight line T parallel with the orbit L of movement of the objective lens 27, the second carriage 20 may be rotated with respect to the first carriage 16 in the direction indicated by the arrow X1 of FIG. 2 to a position where the tracking signal resulting from the light beams reflected from the tracking light spots is set at a predetermined level. At this position, the second carriage 20 is fixed to the first carriage 16 by the bolts 22. In such a manner, a RD (radial dependence) adjustment can be made to bring the orbit L of movement of the objective lens 27 into coincidence with the straight line extending through the center 0 of rotation of the spindle.

Figure 6:
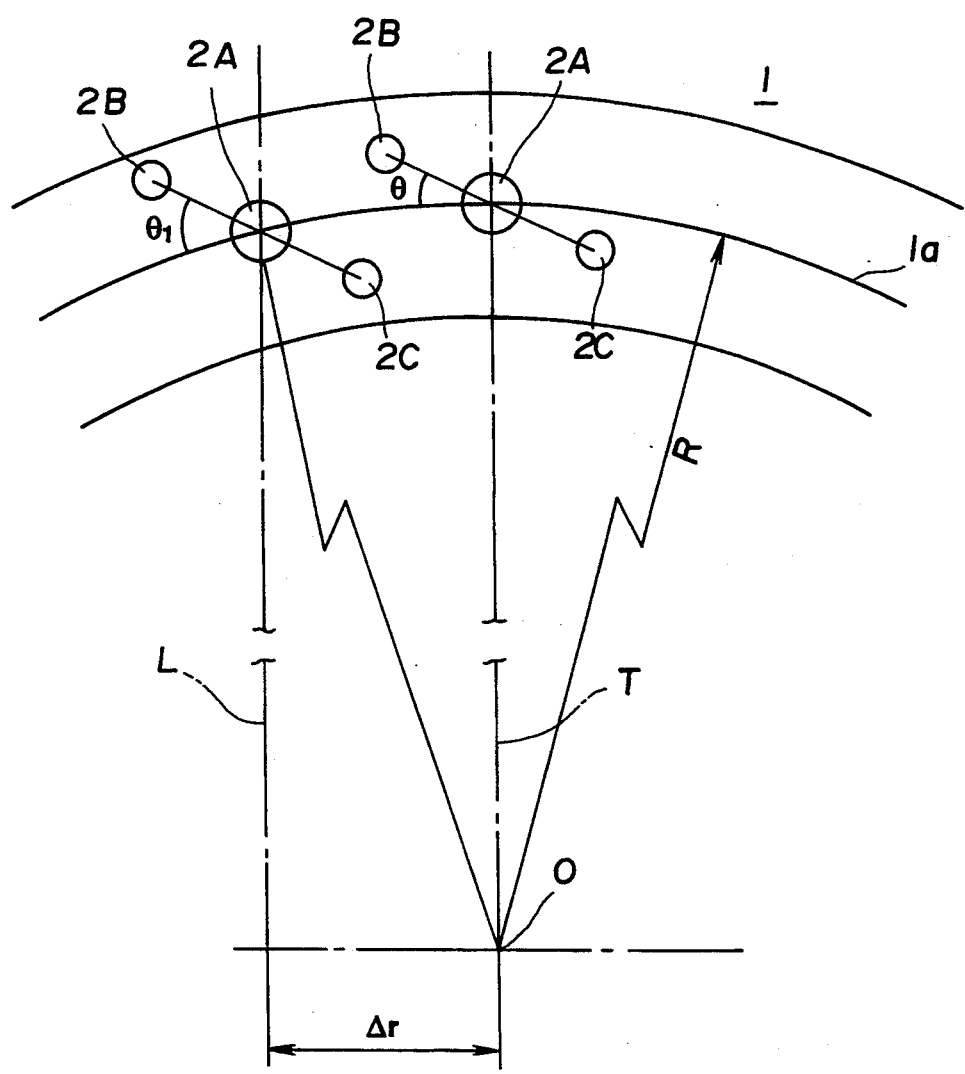
FIG. 6 is a diagram used in explaining the radial dependence adjustment made for detecting the phase difference of the side spots.

When the orbit L of movement of the objective lens 27 is deviated to the right, as viewed in FIG. 6, at a distance $\Delta r$ away from the straight line T extending through the center O of rotation of the spindle, that is, the straight line T parallel with the orbit L of movement of the objective lens 27, the second carriage 20 may be rotated with respect to the first carriage 16 in the direction indicated by the arrow X2 of FIG. 2 to a position where the tracking signal resulting from the light beams reflected from the tracking light spots is set at the predetermined level. At this position, the second carriage 20 is fixed to the first carriage 16 by the bolts 22. In such a manner, a RD (radial dependence) adjustment can be made to bring the orbit L of movement of the objective lens 27 into coincidence with the straight line extending through the center 0 of rotation of the spindle.

Figure 4:
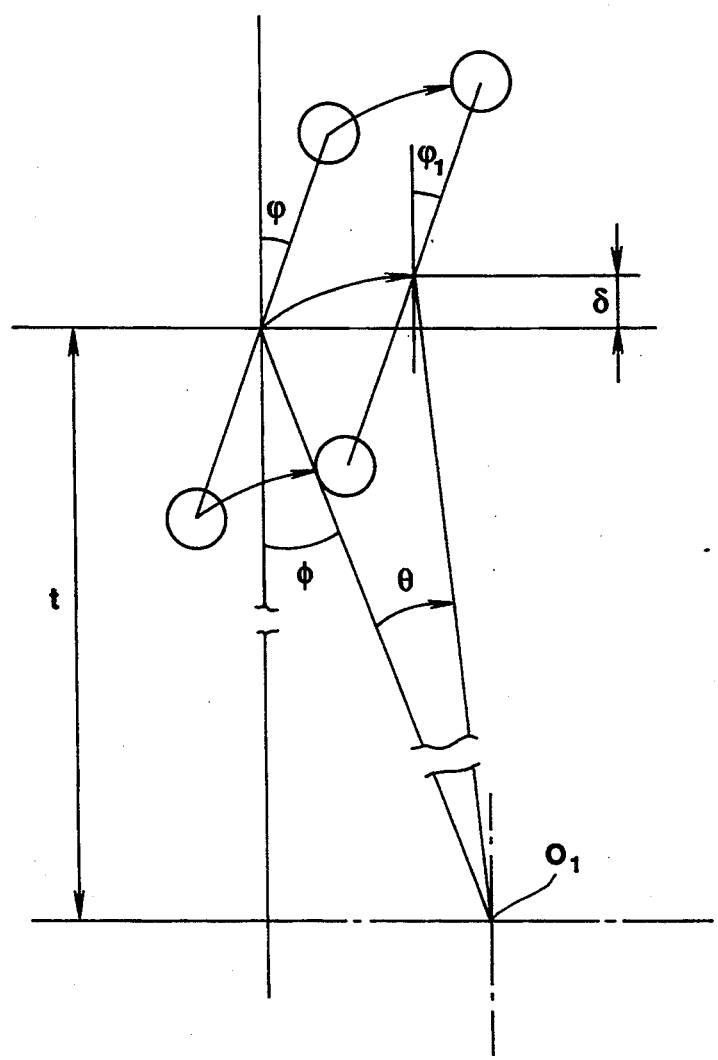
FIG. 4 is a diagram used in explaining a change made in the angle of the spot line with respect to the recording track with rotation of the carriage.

Since the center $O_1$ of rotation of the second carriage 20 is set at a position spaced away from the center of the objective lens 27, the optical pickup device 25 is deviated. It is possible, however, to eliminate this deviation by the rotation adjustment. As shown in FIG. 4, the change $\Delta\Psi$ in the angle $\Psi$ made by the spot line extending through the side spots with respect to the recording track with rotation of the second carriage 20 is given as $$\Delta\Psi = \Psi_1 - \Psi = \theta \tag{2}$$

The deviation $\delta$ of the optical pickup device 25 produced with rotation of the second carriage 20 is given as $$\delta = t\{1 - \cos(\Phi - \theta)/\cos\Phi\} \tag{3}$$

Figure 5:
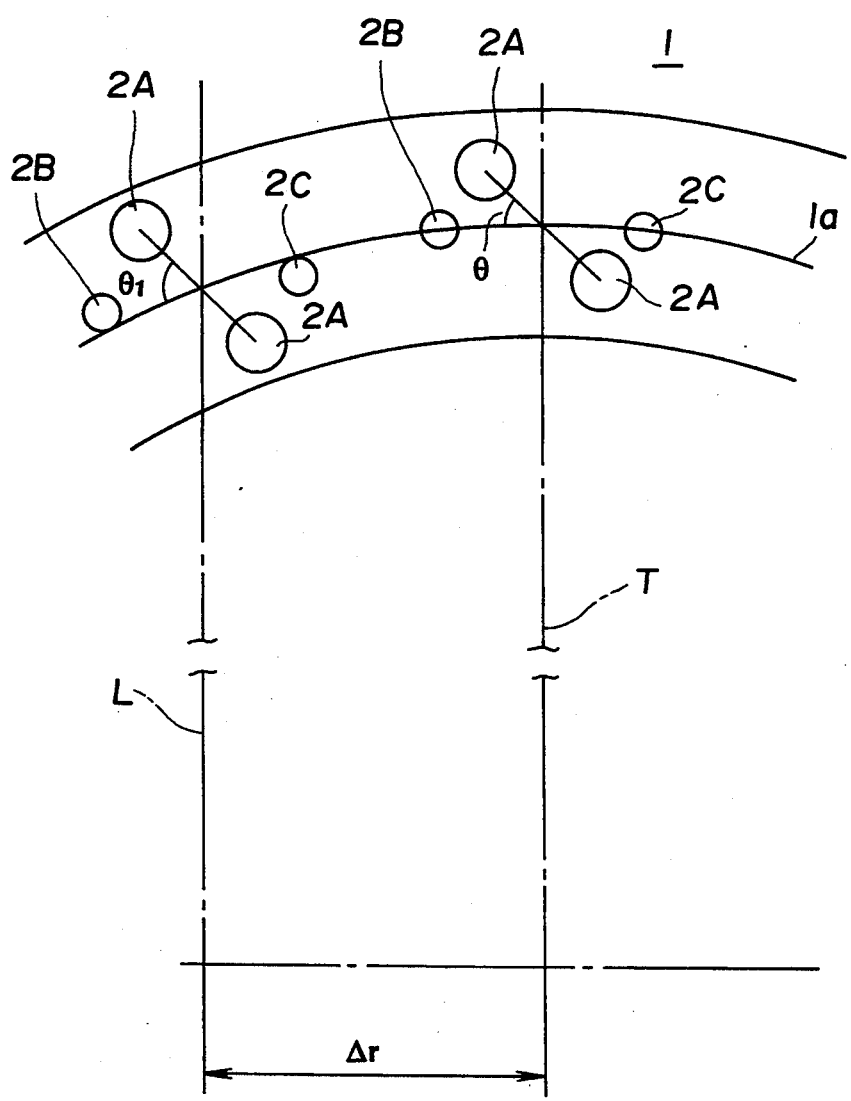
FIG. 5 is a diagram used in explaining the radial dependence adjustment made for detecting the phase difference of the main spot.

Although the invention has been described in connection with the RD (radial dependence) adjustment made based on the measurements of the side spot phase difference since the tracking servo control is regarded as of major importance, it is to be understood that the invention is not limited to such an RD adjustment. A greater importance may be placed on the reproduced signal. The same effect can be obtained when the RD adjustment is made based on the measurements of the main spot phase difference, as shown in FIG. 5. In this case, the second carriage 20 may be rotated and adjusted in such a manner as to provide a 360° phase difference between two main spots.

If the second carriage 20 is rotated and adjusted at a point where the disc radius R is equal to $R_a$, the spot position will be deviated again for a radius other than the disc radius $R_a$ because of the radial dependence. This deviation is given in the form of angle $\theta$ as $$\theta = \Delta r \times \{(1/R) - (1/R_a)\} \tag{4}$$

For this reason, it is possible to retain the angle $\theta$ at a constant for the innermost and outermost orbits so as to minimize the influence of the radial dependence by setting the disc radius $R_a$ as follows:

$$R_a = 2R_i R_o/(R_i + R_o) \tag{5}$$

where $R_i$ and $R_o$ are the radii of the innermost and outermost orbits of the recording/reproducing region, respectively.

While this invention has been described in conjunction with a video disc player, it is to be understood that the invention is also applicable to other optical disc recorders and players.

What is claimed is:

1. An optical pickup driving apparatus for driving an optical pickup device with respect to an optical disc recording medium having a recording track provided therein, the optical pickup device including means for radiating light beams to produce a data reading light spot and tracking light spots so as to read data recorded on the recording track, the optical pickup driving apparatus comprising:

first carriage means guided for movement in a direction parallel with a straight line extending through a center about which the optical disc recording medium rotates;

holding means for holding the optical pickup device;

coupling means for coupling the holding means to the first carriage means for rotation on the first carriage means about a center spaced from the light spots so as to rotate the optical pickup device in a plane parallel with and facing to the optical disc recording medium; and adjusting means for rotating the holding means to adjust the positions of the tracking light spots or the data reading light spot with respect to the recording track.

2. The optical pickup driving apparatus as claimed in claim 1, wherein the coupling means includes:
   a pin member provided on the first carriage means;
   a hole formed in the holding means for engagement with the pin member; and
   means for fixing the holding means to the first carriage means.

3. The optical pickup driving apparatus as claimed in claim 1, wherein the coupling means includes:
   a pin member provided on the holding means;
   a hole formed in the first carriage means for engagement with the pin member; and
   means for fixing the holding means to the first carriage.

4. The optical pickup driving apparatus as claimed in claim 1, wherein the holding means includes:
   second carriage means coupled to the first carriage means through the coupling means;
   a shaft member coupled at its one end to the second carriage means and at the other end thereof to the first carriage means; and
   a base member held rotatably on the shaft member for carrying the optical pickup device.

5. The optical pickup driving apparatus as claimed in claim 4, wherein the shaft member is provided with a roller through which the shaft member is held in abutment with the first carriage means.

6. The optical pickup driving apparatus as claimed in claim 1, wherein the adjusting means includes:
   rotating means for rotating and adjusting the holding means; and
   monitoring means for monitoring changes in a reproduction signal resulting from lights reflected from the spots during rotation of the holding means.

7. The optical pickup driving apparatus as claimed in claim 6, wherein the rotating means includes:
   a first hole formed in the first carriage means;
   a second hole extending through the holding means, the second hole facing to the first hole; and
   an eccentric driver inserted through the second hole and rotated about the first hole to rotate the holding means.

8. The optical pickup driving apparatus as claimed in claim 1, wherein the position $R_a$ at which the data reading light spot or the tracking light spots are to be adjusted with respect to the recording track is given as $$R_a = 2R_i R_o/(R_i + R_o)$$

where $R_i$ and $R_o$ are the radii of the innermost and outermost orbits of the recording/reproducing region of the optical disc recording medium, respectively.

* * * * *